United States Patent Office.

JACOB R. SMITH, OF KEYPORT, NEW JERSEY.

Letters Patent No. 69,852, dated October 15, 1867.

---

IMPROVED MINERAL PAINT.

---

*The Schedule referred to in these Letters Patent and making part of the same.*

---

TO ALL WHOM IT MAY CONCERN:

Be it known that I, JACOB R. SMITH, of Keyport, Monmouth county, New Jersey, have invented a new and improved Mineral Paint; and I do hereby declare that the following is a full, clear, and exact description thereof, which will enable others skilled in the art to make and use the same.

The object of this invention is to form a composition which, when used as a paint, shall form a water and fire-proof coating; and the invention consists in forming the composition, (a sample of which is herewith forwarded,) of the following ingredients, to wit:

Six parts of ground shale; two and a half parts of carbonate of lead; two parts of oxide of iron; one part oxide of lead; one part of ground slate, and a half part of dissolved India rubber. After the above ingredients are properly pulverized and prepared thereby, the whole are then ground together in linseed oil and brought to the proper consistence for use as a paint.

A paint thus made forms a hard and tough coating, which resists the action of both fire and water. It is especially valuable as a coating for old tin roofs, where it is a sure antidote for all leaks, as it forms a new, hard, and tenacious surface over the damaged portion of the roof.

Having thus described my invention, I claim as new, and desire to secure by Letters Patent—

A paint, composed of the ingredients herein named, in the proportions and in the manner substantially as described.

The above specification of my invention signed by me this 18th day of April, 1867.

JACOB R. SMITH.

Witnesses:
WM. F. McNAMARA,
ALEX. F. ROBERTS.